United States Patent [19]

Langieri, Jr. et al.

[11] 4,143,747
[45] Mar. 13, 1979

[54] COASTER BRAKE

[76] Inventors: Michael Langieri, Jr., 8 Cedar St., Butler, N.J. 07405; Robert H. De Graaff, 20 Kennedy Dr., Flanders, N.J. 07836

[21] Appl. No.: 830,348

[22] Filed: Sep. 2, 1977

[51] Int. Cl.² .................. F16D 41/00; F16D 67/02
[52] U.S. Cl. .................. 192/89 W; 192/6 B; 192/41 R; 192/64; 192/94; 192/97
[58] Field of Search ............ 192/6 B, 41 R, 48.92, 192/50, 51, 64, 89 W, 94, 97

[56] References Cited
U.S. PATENT DOCUMENTS

| | | | |
|---|---|---|---|
| 781,825 | 2/1905 | Hedgeland | 192/50 |
| 834,574 | 10/1906 | Haynes | 192/41 R X |
| 1,551,423 | 8/1925 | Netter | 192/41 R |
| 2,137,562 | 11/1938 | Buchanan | 192/6 B |
| 2,246,191 | 6/1941 | Schmitz | 192/6 B X |
| 3,650,363 | 3/1972 | Cristie | 192/64 |

*Primary Examiner*—Allan D. Herrmann
*Attorney, Agent, or Firm*—Salter & Michaelson

[57] ABSTRACT

A drive for a wheeled vehicle including a hub adapted to receive the driving wheel of such vehicle. The hub receives and rotatably supports an axle having a worm screw thereon and positioned within such hub. The worm in turn supports an eccentrically weighted driver of drum-like configuration so that rotational force transmitted to the axle in either direction traverses the weighted driver back and forth within the hub in a generally upright position. The driver resists rotation with the axle by reason of its eccentrically weighted configuration. Driving contact is made between the outer face of the driver and the inner face of the hub ends at opposite sides thereof so that rotation of the axle will cause driving force to be imparted to the hub in either direction dependent on which end of the hub the driver is contacting. When the axle is stationary, the driver is normally positioned out of contact with both of the hub driving faces and accordingly permits the hub to freely rotate about the axle with neither braking nor driving force imparted thereto.

8 Claims, 6 Drawing Figures

COASTER BRAKE

BACKGROUND OF THE INVENTION

This invention relates to a drive mechanism for a wheeled vehicle wherein the driving wheel of such vehicle may be driven in either rotational direction and wherein force applied in the opposite direction to which the wheel is traveling will effect a braking action thereto. Such driving mechanisms have particular utility for transmitting a driving force from a pedal operated vehicle such as a bicycle or tricycle to its driven wheel so that the vehicle can be moved in either direction. With such vehicles it is also desirable that they be able to coast, that is, move without the application of force to the drive wheel, and to further enable the driving wheel to be braked as by the application of force to the driving wheel in a direction opposite to that in which it is traveling.

Devices of this general type are known and include those devices disclosed in U.S. Pat. No. 2,246,191 to Schmitz issued June 17, 1941 and U.S. Pat. No. 3,650,363 to Cristie issued Mar. 21, 1972. The device disclosed in the Schmitz patent includes a driving wheel hub having an axle rotatably supported therethrough. The axle is in turn provided with a threaded portion adapted to receive a driving member 15 comprising a pair of interfitting collars 17, 19 so that rotation of the axle will drive the collars as a unit side to side within the hub. The hub further includes a shoulder portion 27 on one side and a chamfered portion 31 on the other side of the hub with which portions of the collar are adapted to engage in frictional driving relationship so that rotational force imparted to the axle in either direction will impart such force to the driving hub. The driving element made up of the cooperating collar members is prevented from rotating as a unit with the threaded portion of the axle by means of spring clip finger portions 20 which extend in slidable engagement with the surface of the driver member 15.

A similar device in the form of a clutch mechanism is disclosed in the above-identified Cristie patent in which a clutch cone 62 moves axially within a sleeve 56 upon an axle 46 between an engaged driving position and a disengaged position. In the disengaged clutch position, it is possible to simultaneously provide a braking action to the forward movement of the wheel supported by the sleeve or hub 56. This action is accomplished by a screw upon which the clutch cone is mounted for axial movement within the sleeve upon rotation of the axle.

The above citations and discussion of those patents believed pertinent constitute applicant's Prior Art Statement and in that regard copies of the above-indicated patents are enclosed with the subject application.

Although the prior art devices are useful for the purposes indicated, it would be desirable if a more simple and economic means could be devised to permit traversing motion of the driver of such a driving mechanism while preventing it from rotating around the axle without resorting to arrangements such as the spring fingers of Schmitz which are subject to wear and breakage and the complex and accordingly expensive mechanisms of Cristie. It is accordingly a primary object of the present invention to provide a drive mechanism in which an axially movable threadedly mounted driver member is restrained from concurrent rotation with the axle by means of its configuration rather than by means of outside or added elements and which accordingly is less complex and less expensive than known prior art devices.

A further object of the present invention is the provision of a device of the immediately aforementioned type in which the axially movable driver element is eccentrically weighted in such a manner that it resists concurrent rotation with the axle upon which it is threadedly mounted.

Another object is the provision of means which cause the driver to more readily break away from driving engagement when the rotational direction of the axle is reversed.

These and other objects of the present invention are accomplished by the provision of a drive mechanism comprising a hub, said hub having contact faces at opposite inner ends thereof, an axle extending through said hub and supported thereby for rotation in opposite directions, said axle having a threaded screw portion disposed within said hub and an eccentrically weighted driver threadably mounted within said hub upon said screw portion for non-rotational longitudinal movement therewith whereby rotation of said axle in opposite directions traverses said driver from side to side into driving contact with said opposite faces of said hub wherby driving force in opposite directions is imparted to said hub.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
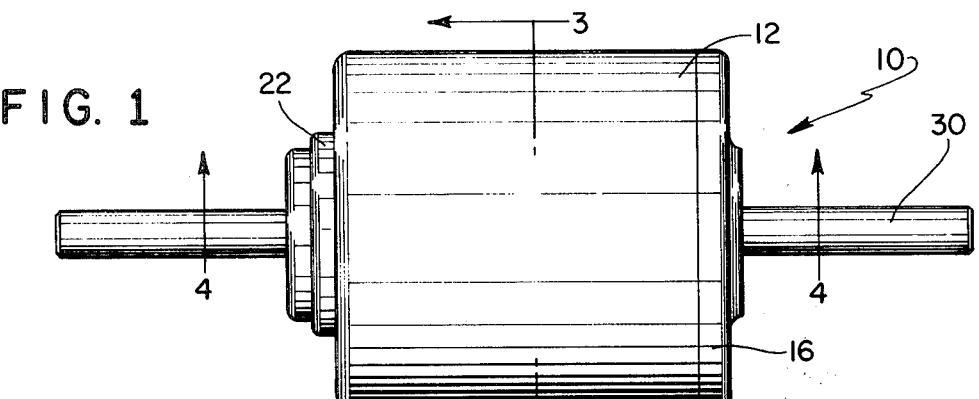
FIG. 1 is a side view of a hub and axle assembly incorporating the present invention.
Figure 2:
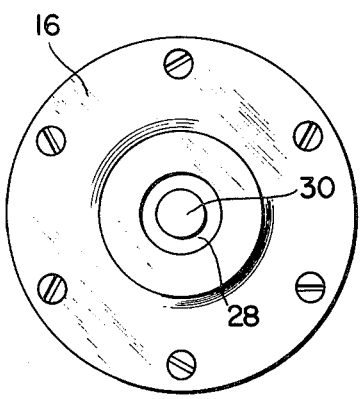
FIG. 2 is an end view thereof taken from the right and side of FIG. 1.
Figure 3:
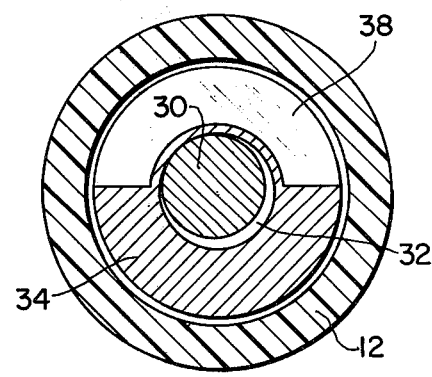
FIG. 3 is a cross-sectional view taken along the line 3—3 of FIG. 1.
Figure 4:
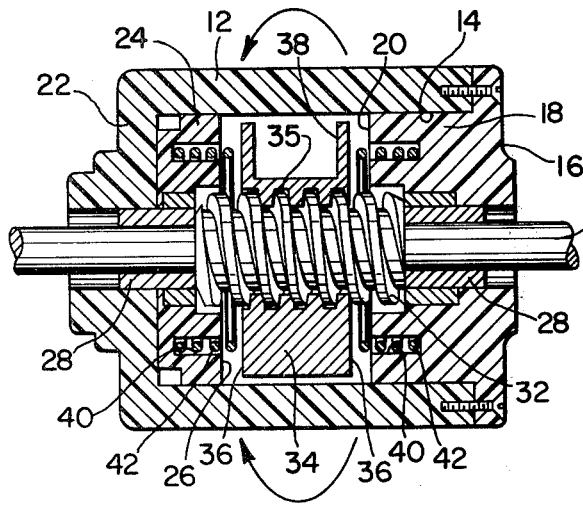
FIG. 4 is a side sectional view taken along the line 4—4 of FIG. 1 and shows the device in a coasting position wherein the hub may move freely with respect to the axle.

Turning now to the drawing and in particular FIGS. 1-4, the device 10 of the present invention includes a hub or housing 12 of generally hollow cylindrical configuration. Such hub includes an open end 14 which is normally closed by an end plate 16 having an inwardly extending boss 18 which in turn includes a first hub driving surface or face 20. The other end of the hub is also generally closed as by an inwardly downwardly extending shoulder 22 to which another boss or disc 24 is secured in any known manner and which in turn comprises a second hub driving face 26.

Both of the bosses 18, 24 include bearings 28 supported therein and upon which an axle 30 is adapted to rotate. The axle is in turn provided with a double lead worm screw 32 attached thereto or integrally formed therewith in any suitable manner and which is disposed within the hub 12. A driver element in the form of a weighted metal drum 34 is supported by the screw 32 and is adapted to ride thereon. The drum 34 is in turn provided with an internal threaded bore 35 which receives the threads of the screw portion 32 with driver faces 36 on either side thereof. The top portion of the drum 34 is provided with a rather large chordal cutout portion 38 which serves to concentrate the greater proportion of the drum's weight on the bottom thereof. The drum is accordingly eccentrically weighted and acts in the manner of a pendulum. Thus as the axle is rotated in either direction the drum will remain more or less stable in the upright position depicted in FIGS. 4-6 rather than rotating as a unit with the axle and screw member 30, 32 respectively.

Figure 5:
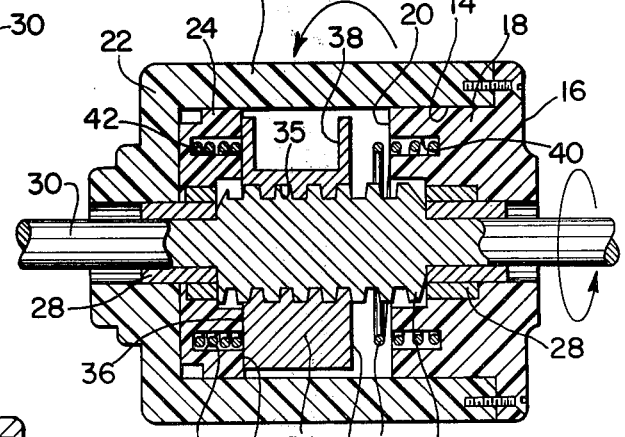
FIG. 5 is a side sectional view similar to FIG. 4 but showing the driver element engaged in driving relationship to the hub wherein the counterclockwise rotational force imparted to the axle will impart a similar driving force to the hub.

Turning now to FIG. 5, it will be seen that counterclockwise rotation of the axle 30, assuming the normal right-hand thread of screw 32, axially forces the drum 34 to the left as shown until the hub driving face 26 and the left-hand side driver face 36 frictionally contact each other. Further rotational force of the axle 30 will cause the drum 34 to rotate the boss 24 and accordingly the entire hub 12 as a unit about the axle and accordingly impart a counterclockwise motion to the hub 12. It should also be brought out that a driving wheel (not shown) is normally attached to the outside of the hub 12 as by spokes and the like and that accordingly such counterclockwise motion to the hub 12 as shown in FIG. 5 would be translated into a rearward motion of the vehicle in which the driving mechanism of the present invention is mounted. Similarly, if the vehicle is moving in a forward direction when the counterclockwise or rearward force is imparted to the hub 12, such force will act as a brake and serve to stop the vehicle.

Figure 6:
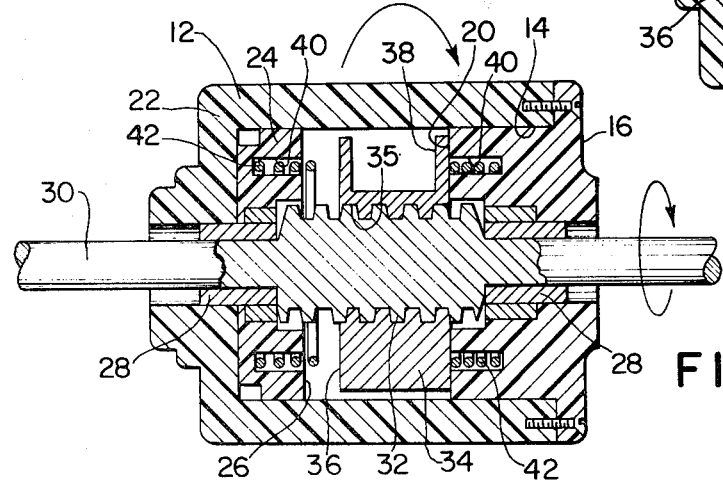
FIG. 6 is a side sectional view similar to FIG. 5 wherein the driver element is shown in driving relationship with the opposite side of the hub wherein the clockwise rotational direction imparted to the axle is similarly imparted to the hub.

Turning now to FIG. 6, the same effect as above described in regard to FIG. 5 but in an opposite direction is illustrated. Therein a clockwise force imparted to the axle 30 serves to traverse the drum 34 to the right wherein its right-hand driving face 36 contacts the hub driving face 20 and accordingly imparts a clockwise or forward motion to the driven wheel which will either serve to drive the vehicle in a forward direction or act as a brake should the vehicle have previously been moving in a rearward direction.

When the drum 34 is in an intermediate position, that is, when the driving faces 36 thereof are not in contact with either end of the hub 12, then the hub is free to rotate about the axle 30 and neither driving or braking force is imparted to the driving wheel of the vehicle, whereby the vehicle is in a coast or free wheeling attitude. In any case, it will be seen that it is not necessary to utilize other mechanisms to restrain the drum 34 from rotating with the axle 30, but rather such result is inherently obtained by the eccentrically mounted and weighted configuration of the drum itself. Such construction enables the producton of an extremely low cost yet effective combination driving and brake mechanism.

It is desirable that immediately upon the cessation of rotational force in either direction to the axle 30 that the driving force be terminated. To this end each of the bosses 18, 24 is provided with an annular recess 40 in which a coil spring 42 is positioned and adapted to project outwardly of the front faces 20 and 26 respectively. Accordingly, it is necessary when the drum 34 is traversed from side to side that such spring 42 be initially compressed prior to permitting either of the driving faces 36 of the drum 34 to contact either of the hub driving faces 20, 36 respectively. Similarly, when rotational force is terminated at the axle, the spring serves to immediately force the drum 34 away from contact with the hub driving surface into which it is incorporated. This causes the drum to break free more readily and quickly. Also it is preferable that the screw portion 32 be, as previously indicated, of a double lead worm which because of its increased pitch over a single lead will enable the drum to traverse from side to side more quickly.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A drive mechanism comprising a hub, said hub having contact faces at opposite inner ends thereof, an axle longitudinally extending through said hub and supported thereby for rotation in opposite directions, said axle having a threaded screw portion disposed within said hub and an eccentrically weighted driver threadably mounted upon said screw portion and within said hub for non-rotational longitudinal movement therewith whereby rotation of said axle in opposite directions traverses said driver from side to side into driving contact with said opposite faces of said hub thereby imparting driving force in opposite directions to said hub.

2. The drive mechanism of claim 1, said driver having a substantial cut out portion on the top thereof so that the bottom is substantially heavier so as to resist rotational movement upon rotation of said axle.

3. The drive mechanism of claim 2, said driver being a cylindrical drum having opposite end faces for contact with said hub contact faces, said cut out portion being an internal chordal section.

4. The drive mechanism of claim 1, said screw portion being a double lead worm screw.

5. The drive mechanism of claim 1, including spring means associated with said hub contact faces for urging said driver out of contact therewith, said spring means exerting a lesser force on said driver than rotation of said axle.

6. The drive mechanism of claim 5, said hub having downwardly extending opposed shoulders at opposite ends thereof, said hub drive faces being the inner opposed surfaces of said shoulders, said hub faces each having an annular recess for receipt of said spring means, said spring means in turn comprising a coil spring positioned in said recess and projecting outwardly of said hub faces wherein said driver compresses said springs prior to contacting said hub faces.

7. A drive mechanism comprising a hub, said hub having contact faces at opposite inner ends thereof, an axle longitudinally extending through said hub and supported thereby for rotation in opposite directions, said axle having a threaded screw portion, disposed within said hub and a driver threadably mounted upon said screw portion for non-rotational longitudinal movement therewith whereby rotation of said axle in opposite directions traverses said driver from side to side into driving contact with said opposite faces of said hub thereby imparting driving force in opposite directions to said hub, said hub contact faces having spring means for urging said driver out of contact therewith, said spring means exerting a lesser force on said driver than rotation of said axle.

8. The drive mechanism of claim 7, said hub having downwardly extending opposed shoulders at opposite ends thereof, said hub drive faces being the inner opposed surfaces of said shoulders, said hub faces each having an annular recess for receipt of said spring means, said spring means in turn comprising a coil spring positioned in said recess and projecting outwardly of said hub faces wherein said driver compresses said springs prior to contacting said hub faces.

* * * * *